(12) United States Patent
Ogawa et al.

(10) Patent No.: US 10,261,478 B2
(45) Date of Patent: Apr. 16, 2019

(54) METHOD FOR INTEGRATED CONTROL OF FUNCTIONAL BLOCKS AND INTEGRATED CONTROL DEVICE

(75) Inventors: Masatsugu Ogawa, Tokyo (JP); Masafumi Yano, Miyagi (JP)

(73) Assignee: NEC CORPORATION, Minato-ku, Tokyo (JP)

(*) Notice: Subject to any disclaimer, the term of this patent is extended or adjusted under 35 U.S.C. 154(b) by 1000 days.

(21) Appl. No.: 14/241,974

(22) PCT Filed: Aug. 29, 2012

(86) PCT No.: PCT/JP2012/072526
§ 371 (c)(1),
(2), (4) Date: Jun. 2, 2014

(87) PCT Pub. No.: WO2013/032022
PCT Pub. Date: Mar. 7, 2013

(65) Prior Publication Data
US 2014/0288674 A1    Sep. 25, 2014

(30) Foreign Application Priority Data
Aug. 30, 2011    (JP) .................................. 2011-187702

(51) Int. Cl.
| G05B 13/02 | (2006.01) |
| G05B 15/02 | (2006.01) |
| G06Q 50/06 | (2012.01) |

(52) U.S. Cl.
CPC ............. *G05B 13/02* (2013.01); *G05B 15/02* (2013.01); *G06Q 50/06* (2013.01)

(58) Field of Classification Search
CPC ......... G05B 13/02; G05B 15/02; G06Q 50/06
See application file for complete search history.

(56) References Cited

U.S. PATENT DOCUMENTS

| 5,283,897 A | * | 2/1994 | Georgiadis ............ G06F 9/5083 711/151 |
| 8,639,813 B2 | * | 1/2014 | Suganthi ............. H04L 63/0272 709/225 |
| 2004/0039622 A1 | * | 2/2004 | Masiello ................ G06Q 10/06 703/2 |
| 2007/0250184 A1 | | 10/2007 | Arita et al. |

(Continued)

FOREIGN PATENT DOCUMENTS

| JP | 5-120256 A | 5/1993 |
| JP | 2000-300000 A | 10/2000 |

(Continued)

*Primary Examiner* — Aniss Chad
*Assistant Examiner* — Steven W Crabb
(74) *Attorney, Agent, or Firm* — Sughrue Mion, PLLC

(57) ABSTRACT

Provided is a control device for a system that includes a plurality of correlated function blocks. The control device includes: a setting unit for setting an evaluation function about a function block state in association with each of the plurality of function blocks; a virtual evaluation function creating unit for setting, as a virtual function block, a group of a predetermined function blocks selected from the plurality of function blocks, and creating a virtual evaluation function by using the evaluation functions of the function blocks contained in the virtual function block; and a system control unit for controlling the system based on the virtual evaluation function.

5 Claims, 10 Drawing Sheets

(56) References Cited

U.S. PATENT DOCUMENTS

2012/0185106 A1* 7/2012 Ghosh .................. G06Q 10/04
                                                                     700/291
2015/0280436 A1* 10/2015 Weckx .................. G06Q 50/06
                                                                     700/295

FOREIGN PATENT DOCUMENTS

| | | |
|---|---|---|
| JP | 2002-165367 A | 6/2002 |
| JP | 2007-166855 A | 6/2007 |
| JP | 2007-287063 A | 11/2007 |
| JP | 2010-279238 A | 12/2010 |

* cited by examiner

METHOD FOR INTEGRATED CONTROL OF FUNCTIONAL BLOCKS AND INTEGRATED CONTROL DEVICE

CROSS REFERENCE TO RELATED APPLICATIONS

This application is a National Stage of International Application No. PCT/JP2012/072526, filed on Aug. 29, 2012, which claims priority from Japanese Patent Application No. 2011-187702, filed on Aug. 30, 2011, the contents of all of which are incorporated herein by reference in their entirety.

TECHNICAL FIELD

This invention relates to a method of controlling a system that includes a plurality of function blocks and runs the function blocks by integrating the function blocks in an autonomous decentralized adaptive manner, and to a control device therefor.

BACKGROUND ART

Currently, an increase in system scale and a phenomenon where a field that has not been systematized is suddenly turned into a large-scale system are in progress in various fields. A typical example of the former is found in the IT field such as data centers and networks that are related to a technology called cloud, and the scale thereof is increasing year after year. An example of the latter is found in the infrastructure field such as electric power, energy networks, and cities, which are suddenly becoming targets to be controlled as a smart grid, a smart city, or other large-scale system cases. How large-scale systems are to be controlled is therefore expected to be a very important issue in the near future.

Add to that, the energy-conscious mindset of today's society demands control that does not waste electric power by shutting down an idling machine or the like. This is a trend not exclusive to the IT field and the infrastructure field, but shared throughout the society. A generally effective action is, for example, exerting control so as to shut down a control object that is idling.

In the case of electric power grids, though only a limited number of electric power houses are controlled in this manner at present, an issue of which power house is to be activated and which power house is to be shut down for efficient generation of electricity has been studied for a long time. This is a matter of load balancing and is called a "unit commitment problem". The "unit commitment problem" includes not only the issue of which power house is to be activated/shut down but also an issue of allocating load optimally among active power houses after determining for each power house whether to activate or shut down. This is a comprehensive matter of activation/shutdown and optimal allocation of load. A solution method that has been employed is offline scheduling based on a scenario that is scripted as a deterministic mathematical programming model.

If the society steers toward further energy saving, innumerable solar energy sources are expected to be connected to conventional power grids. With solar light energy which fluctuates depending on the goings-on in nature, the conventional method of running power houses by offline scheduling would not work well. This means that control needs to be capable of dealing with a very large number of control objects and dealing with an unexpected external disturbance. Offline scheduling cannot be used for dealing with an unexpected external disturbance, and a method of solving the "unit commitment problem" in real time for innumerable electric power nodes (on a large scale) will be sought after in the future.

The "unit commitment problem" exists in the IT field as well.

Examples of control exerted in a system of the IT field include load balancing among computer resources, network load balancing, and decentralized storage arrangement. How load balancing among computer resources is controlled is described by taking as an example a load balancing method that is targeted for a data center (DC) including a plurality of servers.

The basic idea of conventional control eventuates in "balancing the internal state of the system", which is rather unsophisticated. With this mindset, while the control policy is clear in the case of a uniform system (where the plurality of servers are identical servers), what index is to be the basis of balancing is not clear in a mixed-machine system where different types of machines are used.

For instance, while it is known that the CPU utilization ratios of the respective servers are to be balanced in the case of servers having the same performance, it is not obvious how to balance the CPU utilization ratios of servers that have different performance characteristics in a manner that reflects the servers' respective performance. A result obtained by the queuing theory, which is an index often used in conventional control, is an index based on the theory of probability, and tells nothing about what means to use in order to lead the system to a stochastically steady state.

What this means is that, although the system may eventually satisfy requirements to be fulfilled such as response and throughput, the system has no guarantees or limitations with regard to processes in the middle and the situation of resources that are ultimately used. In other words, the resultant control is merely for fulfilling the required performance irrespective of whether the system is in a very inefficient state in terms of energy.

Under such control, the inefficiency grows as the system increases in scale, and is expected to be a serious problem. Shutting down a server that is to be shut down and activating a server that is to be activated with accuracy is important here, too, and server load balancing can be considered as a type of the "unit commitment problem".

The "unit commitment problem" is a problem also associated with many control problems such as storage arrangement control. However, a method of solving the "unit commitment problem" in real time is very difficult to think up of and has not been proposed at present.

Technologies related thereto can be found in, for example, Japanese Unexamined Patent Application Publication (JP-A) No. 2002-165367 (Patent Literature 1), Japanese Unexamined Patent Application Publication (JP-A) No. 2007-166855 (Patent Literature 2), and Japanese Unexamined Patent Application Publication (JP-A) No. 2010-279238 (Patent Literature 3).

Patent Literature 1 relates to a voltage/reactive power control system capable of operating economically through reduction in transmission loss or the like while keeping the voltage at an appropriate level for customers by dealing with the running situation and load situation of an electric power system. Patent Literature 2 discloses an attempt to minimize running cost in scheduling the activation/shutdown of power generators. Patent Literature 3 relates to a system for monitoring and controlling a whole electric power system stably, even an electric power system to which distributed power sources are additionally connected by stages.

CITATION LIST

Patent Literature

Patent Literature 1: JP-A-2002-165367
Patent Literature 2: JP-A-2007-166855
Patent Literature 3: JP-A-2010-279238

DISCLOSURE OF THE INVENTION

Problems to be Solved by the Invention

Solving the "unit commitment problem" in real time by setting an evaluation function to a function block such as a power house or a server is basically feasible according to an idea devised by the inventors of the invention of this application. However, function blocks (or components) are provided in a very large number in recent years, and a way to accomplish more efficient control with this method is sought after.

Running a large-scale and complicate system in a manner that is robust against external disturbance and changing the system depending on the situation in real time are thus very difficult tasks. In addition, executing these control tasks in a scalable manner has been practically impossible.

An object of this invention is to provide a technology for solving the problems of the related arts described above, and to provide a method of controlling a system and a control device for a system, with which a large-scale and complicate system can be run so as to be robust against external disturbance and can be changed depending on the situation in real time.

Means to Solve the Problems

According to one aspect of this invention, there is provided a method of controlling a system having a plurality of correlated function blocks, including:
  setting an evaluation function about a function block state in association with each of the plurality of function blocks;
  setting, as a virtual function block, a group of a predetermined function blocks selected from the plurality of function blocks;
  creating a virtual evaluation function by using the evaluation functions of the function blocks contained in the virtual function block; and
  controlling the system based on the virtual evaluation function.

According to one aspect of this invention, there is also provided a control device for controlling a system having a plurality of correlated function blocks, including:
  setting means for setting an evaluation function about a function block state in association with each of the plurality of function blocks;
  virtual evaluation function creating means for setting, as a virtual function block, a group of a predetermined function blocks selected from the function blocks, and creating a virtual evaluation function by using the evaluation functions of the function blocks contained in the virtual function block; and
  system control means for controlling the system based on the virtual evaluation function.

Effect of the Invention

According to this invention, a large-scale and complicate system can be run so as to be robust against external disturbance and can be changed depending on the situation in real time. These control tasks can thus be executed in a scalable manner.

BEST MODE FOR EMBODYING THE INVENTION

An embodiment mode of this invention is described in detail below with reference to the drawings.

The embodiment mode of this invention provides a way to solve the "unit commitment problem" in real time by a method given below. In other words, the method of controlling function blocks by setting evaluation functions thereto is executed more efficiently, to thereby ensure that a system is controlled without a problem when function blocks are provided in a very large number.

The embodiment mode of this invention is described taking a "unit commitment problem" of power generators as an example. The "unit commitment problem" of power generators discussed here is of the case where power generators having different performances are mixed. The power generators here are capable of actively adjusting power, and this description does not have in mind ones that passively generate power from solar light or the like.

Figure 1:
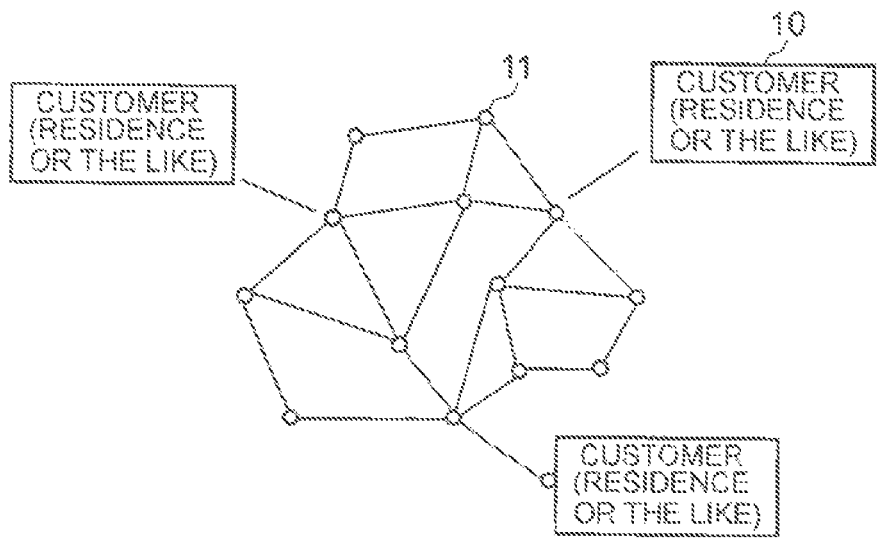
FIG. 1 is a schematic system diagram illustrating the "unit commitment problem".

In the case where passive power generating equipment is incorporated in a system that actively generates power, this invention is basically applicable when a block which controls reverse power flow and other problems is incorporated and exerts control. Discussed below is an issue of executing wasteless power generation while fulfilling overall demand in an electric power network formed of a plurality of (N) power generators having different performances. The definition of wasteless power generation includes not only adjusting the power generation amount but also the activation/shutdown of power generators, which constitutes the "unit commitment problem". Here, a system used in the description of the "unit commitment problem" is illustrated in a schematic diagram of FIG. 1.

There are two issues to be solved in a mixed manner. One of the issues is to determine whether to activate or shut down, and the other issue is the allocation of load. Control objects are herein expressed as function blocks, components, resources, nodes, and the like, but the expressions refer to the same thing.

Determining whether to activate or shut down is an issue of determining which resource out of a group of resources is to be used and which resource is not, or an issue of managing the respective resources. Load arrangement is an issue of how tasks assigned to the overall system are to be allocated to the provided resources in order to accomplish optimization under a certain index. Many existing control methods have attempted to solve these issues individually via a stochastic approach. However, with a simple theory of probability, it is difficult to secure robustness depending on the situation in an ever-changing environment and to deal with changes in environment quickly in real time.

This invention provides an architecture which integrates these two issues and which is capable of securing robustness depending on the situation and dealing with changes in environment quickly in real time. This invention also provides the method which solves the issues unitarily by a deterministic or relational method, instead of a stochastic method.

In the above-mentioned architecture, while the issues of activation/shutdown and load arrangement are solved unitarily as perfect optimization, solving the issues individually, such as only determining whether to activate or shut down, is possible.

In the "unit commitment problem", overall demand needs to be fulfilled by the overall system (in this case, the entirety of networked power generators). Fulfilling the overall demand is called demand-supply balancing, and constitutes a restraint condition. Unless this is fulfilled, there is no sense in maximizing efficiency or profit. The demand in this example is the sum of values of respective operation levels (Mathematical Expression 1) (i represents a function block number, here a number of a power generator), and is expressed by the following Mathematical Expression 2.

$$\lambda_i \qquad \text{Mathematical Expression 1}$$

$$Dem = \sum_i \lambda_i \qquad \text{Mathematical Expression 2}$$

The operation level can be considered as the function block state. The function block state can be regarded as the power of power generator in the description given here.

To accomplish demand-supply balancing, the operation level of each component (resource) is determined with the following equation (Mathematical Expression 3).

$$\frac{d\lambda_i}{dt} = K_1 \cdot \lambda_{nomi} \frac{Dem - \sum_k \lambda_k}{Dem} \qquad \text{Mathematical Expression 3}$$

In this mathematical expression, the symbol $K_1$ is a coefficient equivalent to a gain of a change in operation level. Mathematical Expression 4 represents a normalization coefficient of an element i and is not always necessary. However, multiplying by a normalization coefficient overall is often preferred in the case of heterogeneous components, which is why Mathematical Expression 4 is introduced in Mathematical Expression 3.

$$\lambda_{nom\ i} \qquad \text{Mathematical Expression 4}$$

Mathematical Expression 5 represents an amount equal to a scale of the element. The operation levels of the respective elements are controlled in a manner determined by Mathematical Expression 3, thereby causing the overall system to operate so as to fulfill Dem, which is the restraint condition.

$$\lambda_{nom\ i} \qquad \text{Mathematical Expression 5}$$

Figure 2:
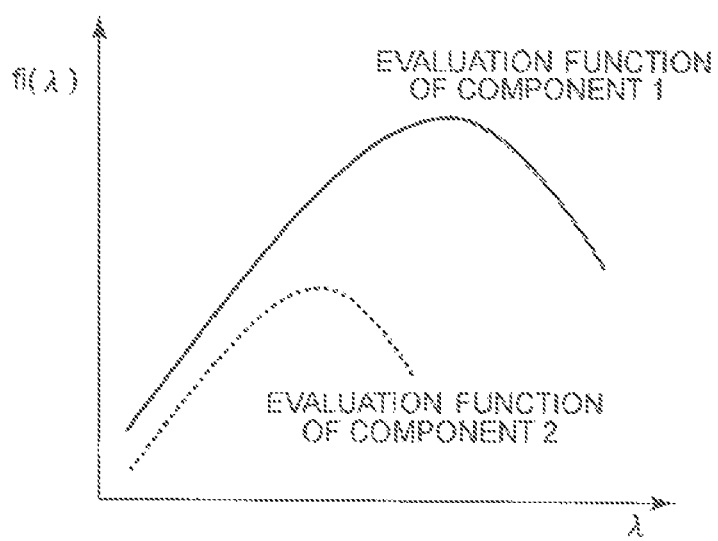
FIG. 2 is a schematic diagram of evaluation functions used in this invention.

Overall profit maximization which equals load arrangement is discussed next. This can be read as overall efficiency maximization. Here we introduce evaluation functions associated with respective components, such as those illustrated in FIG. 2.

The axis of abscissa represents a parameter for controlling each component and, in this example, corresponds to the generated power amount or the like. The axis of ordinate represents an index related to some form of efficiency or profit. Examples of the index related to some form of efficiency are described in detail in embodiments below. The index is therefore regarded here as general efficiency.

An evaluation function related to this efficiency is expressed by a convex function. The use of convex functions is another point of the invention of this application. This is because some form of efficiency, system stability, and the like can be expressed by such convex functions as those illustrated in FIGS. 3A and 3B in many systems. While it is a common practice to call functions that are convexed upward as those in FIG. 2 as concave functions and to call functions that are convexed downward as convex functions, the expression that distinguishes functions by the functions' properties is employed herein, and concave functions, too, are expressed as convex functions.

A problem of accomplishing overall optimization (a state where the sum of values of evaluation functions of the respective components is maximum) through cooperation between components whose evaluation functions are convex functions is known as "convex programming problem". It has mathematically been proven that, in a convex programming problem, optimization is accomplished under a situation where differential values of evaluation functions at the operation levels of the respective components are equal to one another. This principle is applied in this invention, which is the reason why convex functions are used here as evaluation functions.

The inventors of this invention have taken this principle into consideration in writing an equation (Mathematical Expression 6) for accomplishing overall profit maximization as follows.

$$\frac{d\lambda_i}{dt} = K_2 \cdot \lambda_{nomi} \frac{\sum_k \lambda_{nomk}\left(\frac{df_i}{d\lambda_i} - \frac{df_k}{d\lambda_k}\right)}{\sum_k \lambda_{nomk}} \quad \text{Mathematical Expression 6}$$

In this mathematical expression, the symbol $K_2$ is a coefficient equivalent to a gain of a change in operation level. Controlling in this manner causes the respective components to operate so as to equalize the differential values (Mathematical Expression 7) of their evaluation functions at the operation levels.

$$\frac{df_i}{d\lambda_i} \quad \text{Mathematical Expression 7}$$

In order to arrange load optimally while ultimately balancing demand and supply, the demand-supply balancing and overall profit maximization described above need to be solved simultaneously. The operation level of each component is therefore controlled by the following mathematical expression (Mathematical Expression 8) which integrates the two $$\frac{d\lambda_i}{dt} = K_1 \cdot \lambda_{nomi} \frac{Dem - \sum_k \lambda_k}{Dem} + K_2 \cdot \lambda_{nomi} \frac{\sum_k \lambda_{nomk}\left(\frac{df_i}{d\lambda_i} - \frac{df_k}{d\lambda_k}\right)}{\sum_k \lambda_{nomk}} \quad \text{Mathematical Expression 8}$$

Executing the method described above enables the system to solve the issue of load arrangement in real time.

Next, how the activation/shutdown is determined is described below.

Figure 3A:
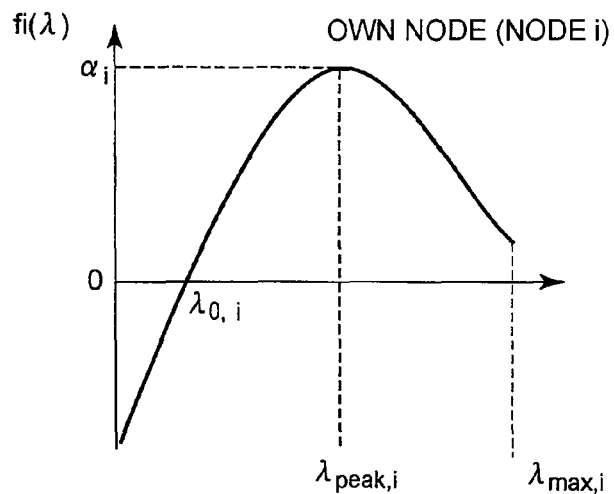
FIG. 3A is a schematic diagram of a relation between an index used in this invention and an evaluation function.
Figure 3B:
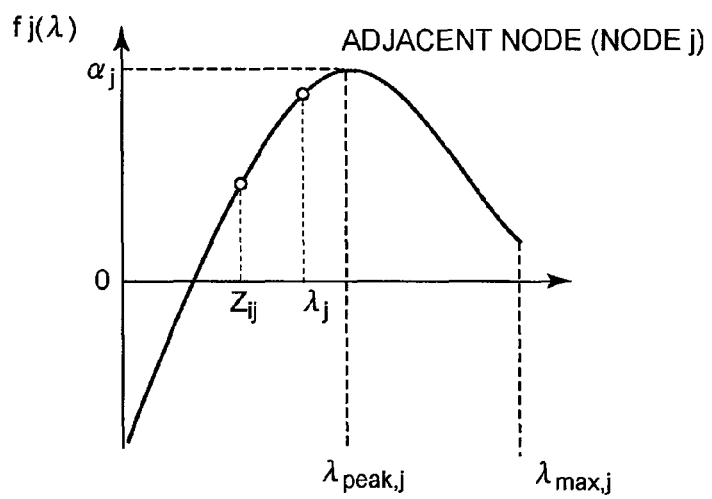
FIG. 3B is a schematic diagram of a relation between an index used in this invention and an evaluation function.

An index is defined first between an evaluation function of its own node and an evaluation function of a node adjacent to the own node. Schematic diagrams of a relation between an index used in this invention and an evaluation function are illustrated in FIGS. 3A and 3B.

In each graph, the efficiency or profit (axis of ordinate) takes a negative value when the load is 0, which means that cost is incurred by allowing a node to be active. In the case where the nodes are power houses and the axis of ordinate represents profit, for example, a power house that is running (active) when there is no demand and there are accordingly no fees to collect from customers reduces the profit by an amount corresponding to the cost of running (activating) the power house. The graphs indicate such state.

In the optimization of data center response, which is discussed in the following embodiments, or similar cases, the axis of ordinate represents an amount related to response and the evaluation function takes a positive value even at a point where the load is 0. While the evaluation function takes a positive value in some cases and a negative value in other cases when the load is 0, preparing for the case where the evaluation function takes a negative value means that the case where the evaluation function has a positive value can be solved as a part thereof. The case where the evaluation function takes a negative value when the load is 0 is therefore described here.

A zero crossing point of a node i (own node) is expressed by Mathematical Expression 9. A point in an evaluation function of an adjacent node j that has the same gradient as the zero crossing point of the node i is expressed by Mathematical Expression 10. The current load of the adjacent node j is expressed by Mathematical Expression 11. Then Mathematical Expression 12 can be expressed by the following expression (Mathematical Expression 13).

$$\lambda_{0,i} \quad \text{Mathematical Expression 9}$$

$$z_{i,j} \quad \text{Mathematical Expression 10}$$

$$\lambda_j \quad \text{Mathematical Expression 11}$$

$$z_{i,i} \quad \text{Mathematical Expression 12}$$

$$\left(\frac{\partial f_j}{\partial \lambda}\right)_{\lambda=z_{ij}} = \left(\frac{\partial f_i}{\partial \lambda}\right)_{\lambda=\lambda_{0,i}} \quad \text{Mathematical Expression 13}$$

The following index (Mathematical Expression 14) is then defined.

$$S_i = \sum_{j \neq i} (\lambda_j - z_{ij}) - \lambda_{0,i} \quad \text{Mathematical Expression 14}$$

This index indicates how much heavier the current load (sum) of the adjacent node is than at the zero crossing point of the own node. A condition for activating the node i, which is shut down at the moment, is whether the situation causes the node i to bear a load equal to or heavier than at the zero crossing point when activated. In this way, the profit of the overall system is prevented from dropping down to a minus figure, and activating the node i does not cause the system to be disadvantage. The index $S_i$ is digitalization thereof. The first term on the right side indicates how much heavier load the adjacent node j is bearing than Mathematical Expression 15, which is equivalent to the differential value of the evaluation function at the zero crossing point of the node i. From the value of the first term on the right side, a value at the zero crossing point (Mathematical Expression 16) is subtracted (the second term on the right side), to thereby obtain an index that indicates whether or not a load equal to or heavier than at its own zero crossing point is found around the own node.

$$z_{i,j} \quad \text{Mathematical Expression 15}$$

$$\lambda_{0,i} \quad \text{Mathematical Expression 16}$$

In the case where $S_i$ is larger than 0, load born by one of adjacent nodes is shared by the node i when the node i is activated, and the load that the node i bears is equal to or heavier than at the zero crossing point. In the case where $S_i$ is smaller than 0, on the other hand, load that the node i newly shares with the adjacent node j has a value equal to or less than at the zero crossing point, and activating the node i turns profit into a minus figure. The index $S_i$ has the characteristics described above, and whether to activate or shut down the node i is understood by seeing whether $S_i$ has a positive value or a negative value. $S_i$ having a negative value indicates that the load of the node i at that point is in an area where the evaluation function takes a negative value, and it can be interpreted that an active node is shut down at the time when the evaluation function becomes 0 or less.

When shutting down an active node, one more thing needs to be taken into consideration, which relates to activation/shutdown in the case where nodes have the same performance. As mentioned above, when activating nodes costs, allowing only one of the nodes to be active while shutting down the rest is often advisable. In the case of nodes that have the same performance, however, which node is to be shut down cannot be determined by the current method. In this invention, the following algorithm is therefore introduced to the control.

"A node is shut down when the evaluation function value is equal to or less than 0 and is the smallest among adjacent nodes. The value comparison is made between active nodes. The node is shut down even when a plurality of nodes have the minimum value."

In this way, in the case where the network is a fully connected network, only one node ultimately remains despite all nodes having the same performance. Although there is a chance that a few segments remain even with this algorithm in the case of a sparsely connected network, such cases can be dealt with by performing the algorithm after searching for practically adjacent nodes via a load balancer, or by other methods.

As described above, the "unit commitment problem" can be solved in real time by executing the monitoring of the index of Mathematical Expression 14 and activation/shutdown determination based on the shutdown algorithm while controlling output via Mathematical Expression 8. This is revolutionary compared to existing methods which solve the "unit commitment problem" by scheduling in advance, because this is capable of quickly dealing with an unexpected external disturbance or a change in demand-supply in real time.

In addition, this system basically operates independently in an autonomous decentralized manner. Therefore, when a failure occurs in some part of the system, other components autonomously perform recovery to compensate for the loss of signals from a failed component. The system can also shift toward a proper operation gradually and autonomously after a sudden addition or removal of a component. In other words, the system is very robust with respect to an external disturbance, and has a scalability that gives freedom in adding/removing components.

A conventional system is helpless to a failure or needs to prepare various error sequences. There is also no guarantee that the stability of the overall system is maintained after an unplanned addition or removal of a component (resource), and programs and processing need to be reviewed each time. The system of this invention is capable of solving all these problems through autonomous decentralized adaptive control.

The description of demand-supply balancing given above mentions that demand-supply balancing is often a restraint condition that demands fulfillment of the total amount of mission or task required of the overall system. However, there could be other cases and, in those cases, control is exerted by transforming the term of demand-supply balancing described above so that a restraint condition thereof is fulfilled. In the case of an electric power system or the like where an unbalancing of the demand-supply balance can be detected from fluctuations in alternating current frequency, demand-supply balancing, too, can be executed in a completely autonomous decentralized manner. In other words, nodes that can obtain information about demand-supply balancing from themselves constitute a true autonomous decentralized system which does not need overall information.

A detailed operation of this invention is described below.

Figure 4:
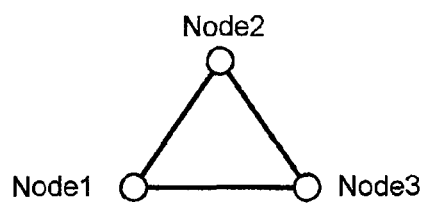
FIG. 4 is a schematic diagram of a network structure as an example used for the verification of this invention.

For simplification, the description here uses an example in which this invention is applied to a network state having a triangular structure in which three nodes are connected to one another. This network structure is illustrated in FIG. 4.

Figure 5A:
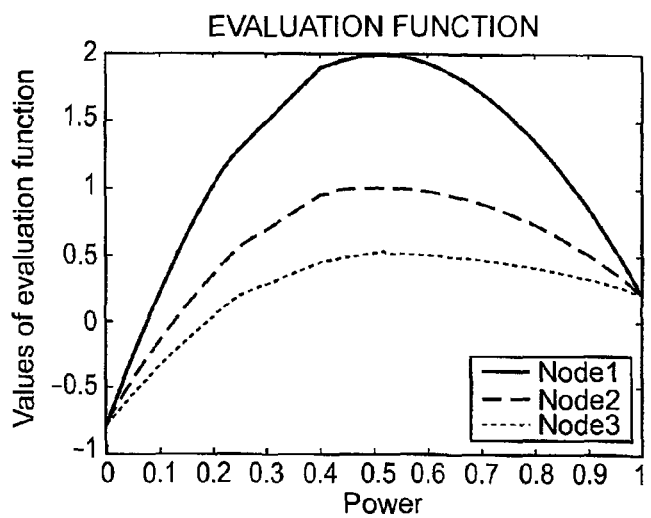
FIG. 5A is an explanatory diagram illustrating an example of an operation result of this invention.
Figure 5B:
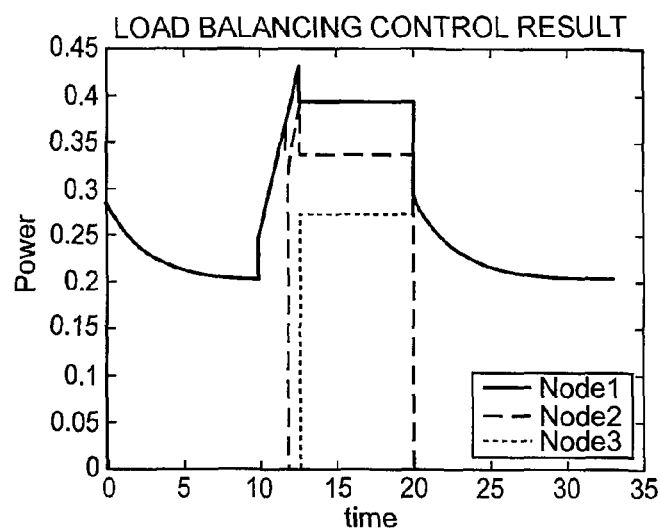
FIG. 5B is an explanatory diagram illustrating an example of an operation result of this invention.
Figure 5C:
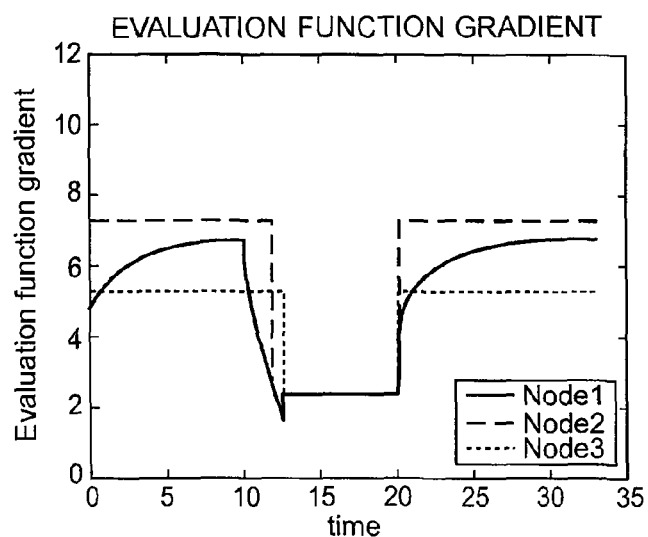
FIG. 5C is an explanatory diagram illustrating an example of an operation result of this invention.

First, different evaluation functions are set to the three nodes as illustrated in FIGS. 5A, 5B, and 5C. Thereafter, the activation/shutdown and load sharing of the nodes are executed through the control of this invention, while changing the overall demand to 0.2 from a time 0 to a time 10, 1.0 from the time 10 to a time 20, and back to 0.2 past the time 20. How the control is executed is also illustrated in FIG. 5.

The drawings show that only a node 1 which has the highest profit efficiency is activated when the overall demand is 0.2. When the overall demand increases to 1.0, a node 2 and a node 3 are activated in the order of performance, and load sharing is set. When the overall demand is back to 0.2, the nodes 2 and 3 are shut down to return to the state where only the node 1 is active. The control of this invention is designed so that an optimum solution to the unit commitment problem is obtained mathematically. This thus mean that the system can adapt to an external disturbance (a sudden change in demand) while solving the unit commitment problem in real time (dynamically), which is a very significant achievement.

Figure 6A:
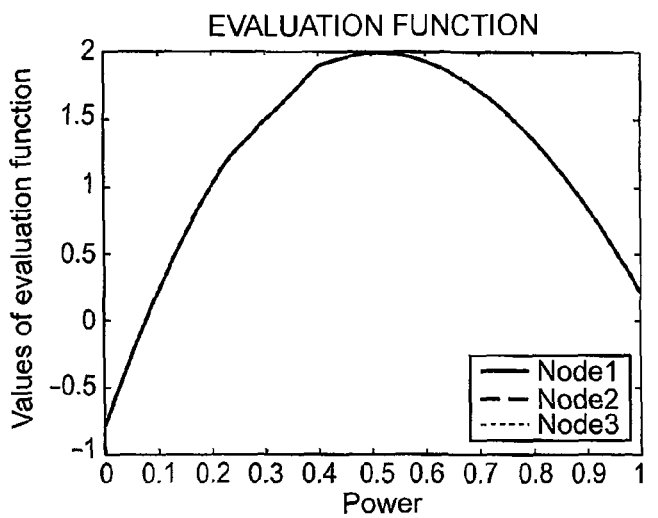
FIG. 6A is an explanatory diagram illustrating an example of an operation result of this invention.
Figure 6B:
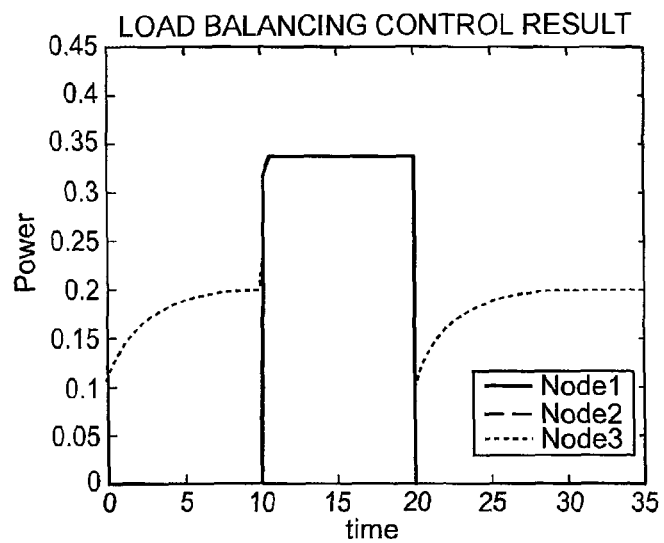
FIG. 6B is an explanatory diagram illustrating an example of an operation result of this invention.
Figure 6C:
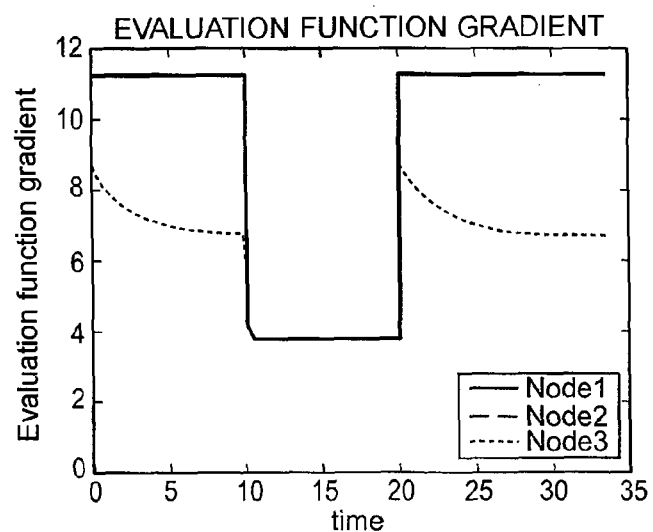
FIG. 6C is an explanatory diagram illustrating an example of an operation result of this invention.

An example of the case where the three nodes have the same performance is illustrated in FIGS. 6A, 6B, and 6C. Evaluation function graphs of the nodes which have the same performance all overlap one another as if only one graph is illustrated. In this case, too, the overall demand has been changed to 0.2 from the time 0 to the time 10, 1.0 from the time 10 to the time 20, and back to 0.2 past the time 20. Because all nodes have the same performance, though it may not be clear, only the node 3 is active when the overall demand is 0.2, and the three nodes equally share load when the overall demand is 1.0.

This invention is thus effective for optimization also when activating a node costs and nodes have the same performance.

The function, operation, and configuration of this invention is described next taking as an example a "unit commitment problem" of servers in a data center, which can be paraphrased as a matter of load balancing in a data center. The data center assumed here has a mixture of servers having different performances, and evaluation functions which are convex functions as those described above and which reflect the difference in performance are set to the respective servers. The control method of this invention described above is used here.

Figure 7:
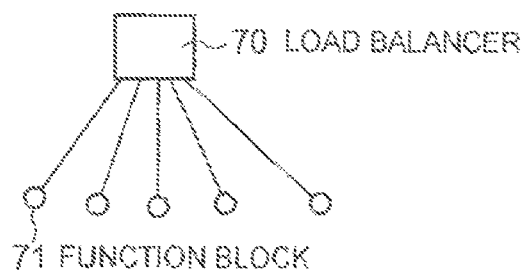
FIG. 7 is a schematic diagram of a function block network configuration that uses a single load balancer.

In server load balancing, a configuration in which servers (function blocks 71) are connected to a single load balancer 70 as illustrated in FIG. 7 is employed often. This configuration is called a star type. Total load which is borne by all servers (function blocks 71) together in this case is first input to the load balancer 70, which balances load by calculating the allocation of load for each of the servers (function blocks 71) and outputting the allocated load to the server (function block 71).

Other than this, there is a case where the load balancer 70 is not provided and load is input to the respective servers (function blocks 71) independently of one another to be balanced among the servers (function blocks 71) by themselves. This invention is applicable to both cases. The example given here is the case of the star type, which is simpler to describe.

Figure 8:
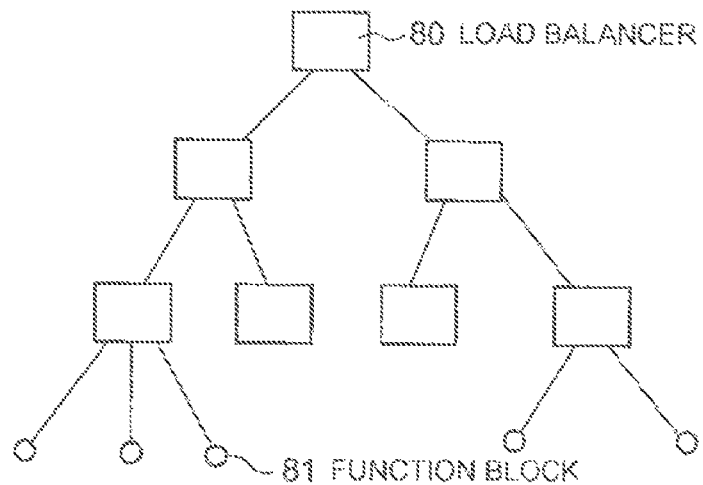
FIG. 8 is a schematic diagram of a function block network configuration that uses hierarchized load balancers.

As is obvious from the configuration of the star type, the processing amount of the load balancer 70 is larger when the count of the servers (function blocks 71) connected to the load balancer 70 is higher. Load balancing via the load balancer 70 therefore often uses hierarchized load balancers 80 as illustrated in FIG. 8 as a method of reducing the processing load of each load balancer 80. Hierarchized in this manner, each load balancer 80 only needs to consider load balancing among a few lower load balancers 80 connected to itself even when the total count of servers (function blocks 81) increases, and the processing load of each load balancer 80 is reduced drastically.

However, with the control method of this invention which sets only evaluation functions to the function blocks 81 (servers in this case) of terminals, how load is to be balanced among the load balancers 80 is not self-evident. Performing load balancing among the hierarchized load balancers 80 without due consideration results in load balancing where each server (function block 81) which is a terminal is allocated a load that is wrong for the ability of the server (inefficient load balancing).

Accordingly, this invention presents an idea about how load is to be balanced among the load balancers 80 in order to balance load optimally among the function blocks 81 when the function blocks 81 are hierarchized via the load balancers 80. While described here is a case where the function blocks 81 which are servers are hierarchized via the load balancers 80, function blocks (here, servers) that handle the same function as that of a load balancer may be set as load balancers instead.

In that case, upper function blocks (servers that play the role of load balancers) may, or may not, handle the processing of load itself in addition to load balancing. Evaluation functions of the upper function blocks are taken into consideration in implementing the following idea in the case where the upper function blocks handle the processing, and the following idea is implemented without taking evaluation functions of the upper function blocks into consideration in the case where the upper function blocks do not handle the processing.

The control method of this invention described above accomplishes the optimization of the overall system (all function blocks) merely by setting evaluation functions that are convex functions to function blocks and controlling so that the evaluation function of each function block and the evaluation function of its adjacent function block have the same differential value. A further exploration of this principle leads to a conclusion that a relation between the overall load of the system set by the control method of this invention and the overall profit (efficiency) of the system is also a convex function that can be defined uniquely by evaluation functions of the function blocks. This means that, when a load balancer under which function blocks are grouped is viewed as a virtual function block, a virtual evaluation function of the load balancer can be determined uniquely as the sum total of evaluation functions of the function blocks.

By applying this, virtual evaluation functions can be set to all of the load balancers 80 hierarchized as in FIG. 8 just by setting evaluation functions of function blocks. Evaluation functions of the function blocks 81 can be used to set first a virtual evaluation function of the load balancer 80 that groups together the function blocks 81, then set a virtual evaluation function to an upper load balancer 80 that groups together the load balancers 80, and ultimately set a virtual evaluation function of the top load balancer 80. The thus set virtual evaluation functions reflect the characteristics of the function blocks 81 (here, servers) of terminals. Therefore, by inputting a load that is to be processed by the whole system only to the top load balancer 80 and sequentially distributing the load down the hierarchy with the use of virtual evaluation functions of the lower load balancers 80, loads input to the servers are optimized ultimately. In other words, the amount of server load balancing is exactly the same in the configuration of FIG. 7 and the configuration of FIG. 8.

How to create the virtual evaluation function is described next.

The operation level of each function block is expressed by Mathematical Expression 17 (i represents a function block number). An evaluation function of the function block is expressed by Mathematical Expression 18. A differential of the evaluation function at the operation level is expressed by Mathematical Expression 19. An inverse function thereof is expressed by Mathematical Expression 20. When the axis of abscissa and axis of ordinate of the virtual evaluation function are expressed by Mathematical Expression 21 and Mathematical Expression 22 (j is a number assigned to a virtual function block for which the virtual evaluation function is created), respectively, Mathematical Expression 24 and Mathematical Expression 25 are calculated for a certain value (Mathematical Expression 23).

$$\lambda_i \qquad \text{Mathematical Expression 17}$$

$$f_i \qquad \text{Mathematical Expression 18}$$

$$h_i = \frac{df_i}{d\lambda_i} \qquad \text{Mathematical Expression 19}$$

$$h_i^{-1} \qquad \text{Mathematical Expression 20}$$

$$\lambda_{uj} \qquad \text{Mathematical Expression 21}$$

$$f_{uj} \qquad \text{Mathematical Expression 22}$$

$$\eta \qquad \text{Mathematical Expression 23}$$

$$\lambda_{uj} = \sum_i h_i^{-1}(\eta) \qquad \text{Mathematical Expression 24}$$

(added only when $h_i^{-1} > 0$ is true)

$$f_{uj} = \sum_i f_i\lfloor h_i^{-1}(\eta)\rfloor \qquad \text{Mathematical Expression 25}$$

(added only when $h_i^{-1} > 0$ is true)

To create an evaluation function of an upper virtual function block from virtual function blocks, Mathematical Expression 26 and Mathematical Expression 27 are replaced with Mathematical Expression 28 and Mathematical Expression 29 in the above calculation. A function block for which the value of Mathematical Expression 30 is equal to or less than 0 is shut down in the control method of this invention described above, and the value of that function block is not included in the calculation of a virtual evaluation function value.

$$f_{uj} \qquad \text{Mathematical Expression 26}$$

$$\lambda_{uj} \qquad \text{Mathematical Expression 27}$$

$$f_i \qquad \text{Mathematical Expression 28}$$

$$\lambda_i \qquad \text{Mathematical Expression 29}$$

$$h_i^{-1} \qquad \text{Mathematical Expression 30}$$

The virtual evaluation function goes through changes that reflect the activation/shutdown state of function blocks. This indicates that the "unit commitment problem" is being solved in real time, and that the system is robust against external disturbance. This characteristic is the same as in the case where a virtual evaluation function is not used.

This invention makes efficient control possible even when there are a very large number of function blocks. In addition, this invention is applicable not only to the "unit commitment problem" but also to normal control such as the control of an actuator of a robot as shown in an embodiment below.

Next, the embodiments of this invention are described in detail.

First Embodiment

Figure 9:
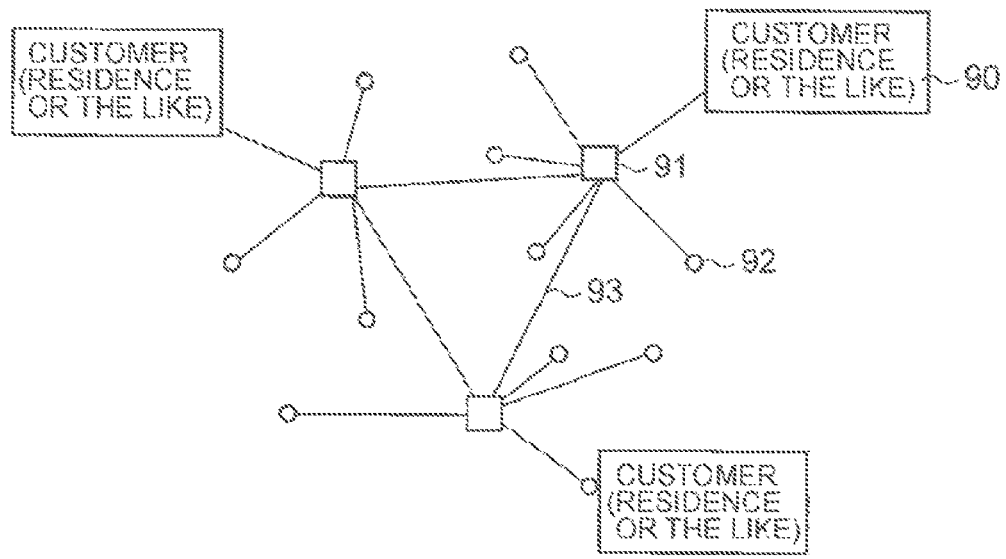
FIG. 9 is a schematic diagram of a system studied in a first embodiment of this invention.

This invention has been carried out and applied with respect to the "unit commitment problem" of the power generators illustrated in FIG. 9.

An operation level (Mathematical Expression 31) (i represents a function block number) of a power generator in this case corresponds to a generated power that is allocated to the power generator.

$$\lambda_i \quad \text{Mathematical Expression 31}$$

Evaluation functions as those illustrated in FIG. 3 are set to the respective power generators. Performance is not uniform among the generators, and the peak value ($\alpha$) and the limit power value ($\lambda$max) vary from one generator to another. The axis of ordinate represents an economical profit from power generation. Accordingly, when the evaluation function of a power generator has a positive value, power generation by the power generator profits the owner of the power generator, and incurs loss when the evaluation function has a negative value. It is desired on the whole for the electric power system to control individual power generators to the demand so that profit is maximized. The evaluation function value is a negative value when load is 0, where activating a power generator costs. The set evaluation functions are quadratic functions which are convex functions. It is a known fact that a profit function of a power generator can be approximated by a quadratic function.

In this embodiment, a function block 91 having a load balancer function is arranged for each customer 90 in a place closest to the customer 90. The load balancers (function blocks 91) divide power generators 92 into several segments. The load balancers (function blocks 91) are connected to one another by a network 93, and form a network of interconnected power generators on the whole.

Figure 10:
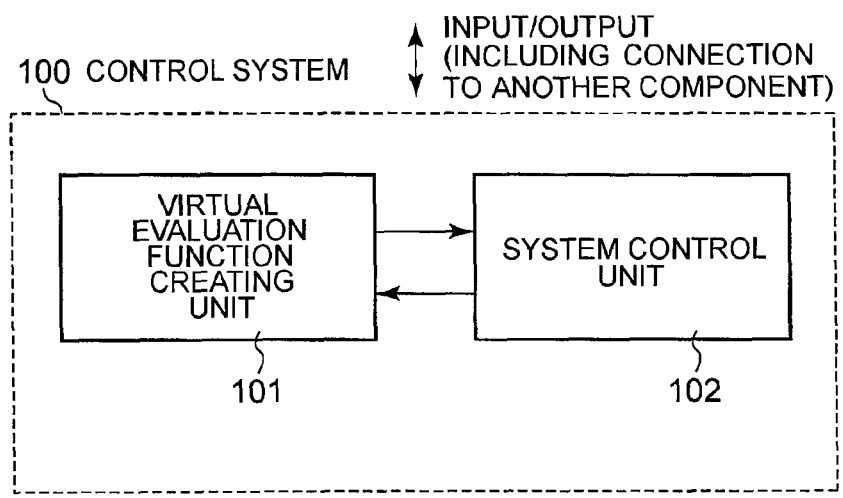
FIG. 10 is a schematic diagram of the architecture of this invention.

The load balancers (function blocks 91) each have a control system 100 according to this invention as a built-in component as illustrated in FIG. 10.

The control system 100 includes a virtual evaluation function creating unit 101 and a system control unit 102 as illustrated in FIG. 10. The virtual evaluation function creating unit 101 creates a virtual evaluation function with the use of evaluation functions of the power generators 92 that are connected to its own load balancer. The system control unit 102 compares the virtual evaluation function to that of another load balancer, to thereby determine the load allocation of the respective segments.

Thereafter, the control system 100 similarly allocates the allocated load among the power generators 92 that are connected to its own load balancer based on evaluation functions of the power generators 92. The overall load of the system is optimized in this manner.

Whether overall demand is being fulfilled can be known locally in the control of the power generators 92. Knowing locally means that each power generator 92 can know from information that the power generator 92 obtains from its surroundings, without obtaining overall information. The alternating current frequency is known to decrease uniformly throughout the system when the supply of electric power is short and, conversely, to increase when electric power is supplied in excess.

By using this principle, whether the generated power is excessive or short with respect to the overall demand can be determined locally without knowing the generated power of all generators 92. In short, the first term on the right side of Mathematical Expression 4 can be calculated locally. In addition, the second term on the right side of Mathematical Expression 4 is locally obtained information to begin with. The power generators 92 can consequently accomplish control of Mathematical Expression 4 with local information alone.

Accordingly, there is no need for a centralizing device that monitors the generated power of all generators 92 in order to know information about overall demand Although the control system 100 here is provided in the load balancers (function blocks 91) instead of the power generators 92, the same is true and each load balancer (function block 91) can know the overall demand locally.

Coefficients $K_1$ and $K_2$ for determining load balancing have been set suitably. The profit is not uniform among the power generators 92, and a, is set higher for a power generator 92 that has a higher profit.

A conventional system configuration has been built alongside in order to compare this invention against a conventional system. The power generator network of FIG. 1 has been used for this comparison. The count and position of the power generators 11 and the count and position of customers are the same as those in FIG. 9. The difference is whether the network has a hierarchized configuration or not.

In the conventional system example (see FIG. 1), components are not hierarchized and there is no function block that serves as a load balancer. Each power generator 11 is therefore newly provided with the same control system 100 that is illustrated in FIG. 10. However, the virtual evaluation function creating unit 101 (see FIG. 10) which is unnecessary in this case is not put into use and only the system control unit 102 (see FIG. 10) is used.

Figure 11A:
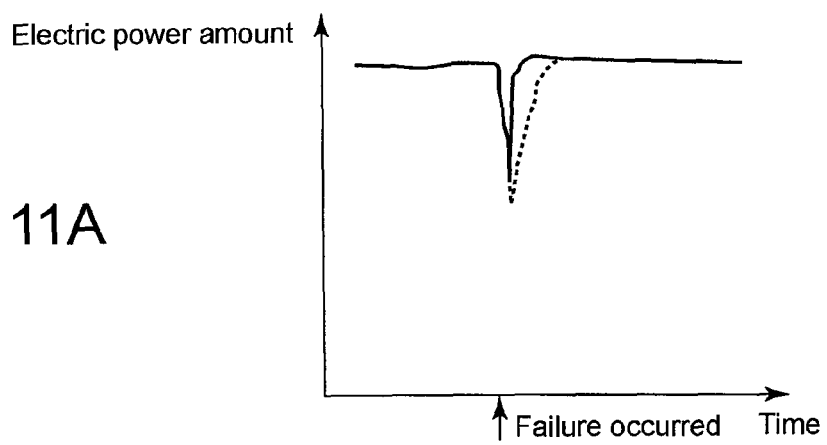
FIG. 11A is an explanatory diagram illustrating an experiment result in the first embodiment of this invention.
Figure 11B:
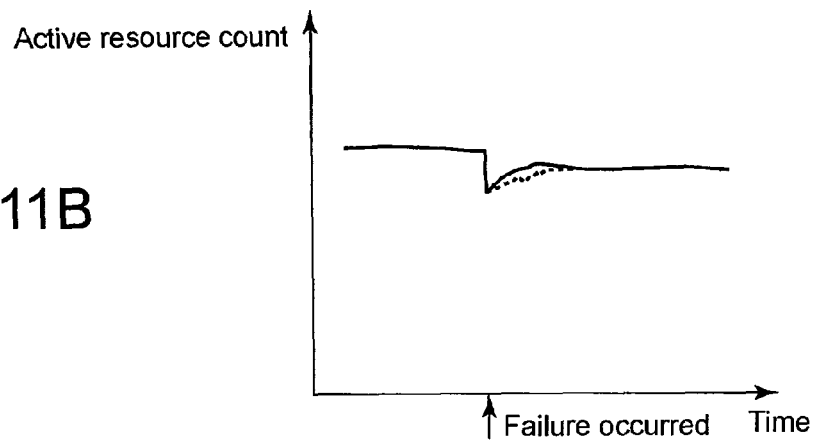
FIG. 11B is an explanatory diagram illustrating an experiment result in the first embodiment of this invention.

FIGS. 11A and 11B show experiment results of the first embodiment of this invention and the conventional system example.

The axis of abscissa represents time in each of the graphs. The axis of ordinate represents the overall electric power of the system (electric power amount) in FIG. 11A, and the count of generators that are active (active resource amount) in FIG. 11B.

When the system is operating to meet a certain power demand, ten percent of generators are artificially stopped (a point indicated by an arrow in each graph). The solid line represents the first embodiment of this invention and the broken line represents the conventional system example in which the components are not hierarchized.

The graphs show that, in both cases, the power supply ability drops temporarily but recovers autonomously. The graphs also show that the first embodiment of this invention is quicker to recover. The quickness is owing to the efficiency in calculation and network which is brought about by hierarchization (see FIG. 9), and the effectiveness of this invention has been confirmed. Because the system has heterogeneous power generators whose abilities are not uniform, the count of power generators that are in use after autonomous recovery differs from before the power generators are stopped artificially. This is the very indication that the unit commitment problem has been solved autonomously. The effectiveness of this invention with regard to robustness against failure has thus been confirmed as well.

Second Embodiment

Control for the unit commitment problem of power generators has been described in the first embodiment. The second and subsequent embodiments discuss embodiments in other fields in order to show the wide range of application of this invention.

Figure 12:
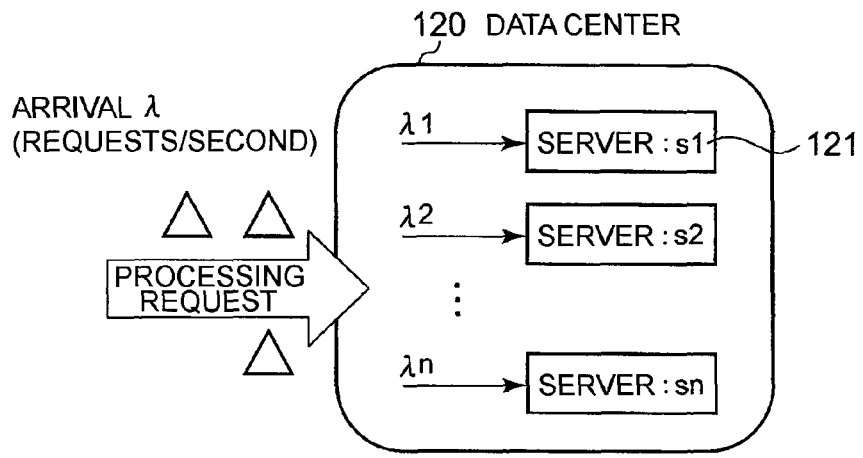
FIG. 12 is a schematic diagram of a system studied in a second embodiment of this invention.

This invention has been carried out for and applied to load balancing among resources of a data center which is illustrated in FIG. 12. The operation level of a resource in this case, which is represented by Mathematical Expression 32 (i represents a function block number), corresponds to a task amount (workload) that is allocated to the resource.

$$\lambda_i \qquad \text{Mathematical Expression 32}$$

As illustrated in FIG. 12, a data center 120 includes a plurality of servers 121. When balancing load among resources of the data center 120, restraint conditions that matter to an administrator are response, throughput, energy, and the like.

An embodiment of this invention in which response and throughput are restraint conditions is described first.

Response and throughput are closely related amounts and, in addition, have a trade-off relation. To give a brief description, throughput rises and response drops as the server 121 approaches its processing limit. Response also has a characteristic in that the drop that occurs when the server 121 approaches the processing limit is sharp, which is explained by the queuing theory. The administrator of the servers 121 needs to balance load on the servers 121 so that response requests and throughput requests of a system that the administrator manages are balanced as much as possible.

Settings to be set by an administrator in order to realize load balancing in the data center 120 are described by way of this invention. Because response and throughput are in a trade-off relation as described above, a rather light workload (Mathematical Expression 33) is to be distributed among components (resources) when response is valued more, and a heavy workload is to be distributed when throughput is valued more. Accordingly, functions set to the respective components are set by, for example, the following method.

$$\lambda_j \qquad \text{Mathematical Expression 33}$$

Figure 13:
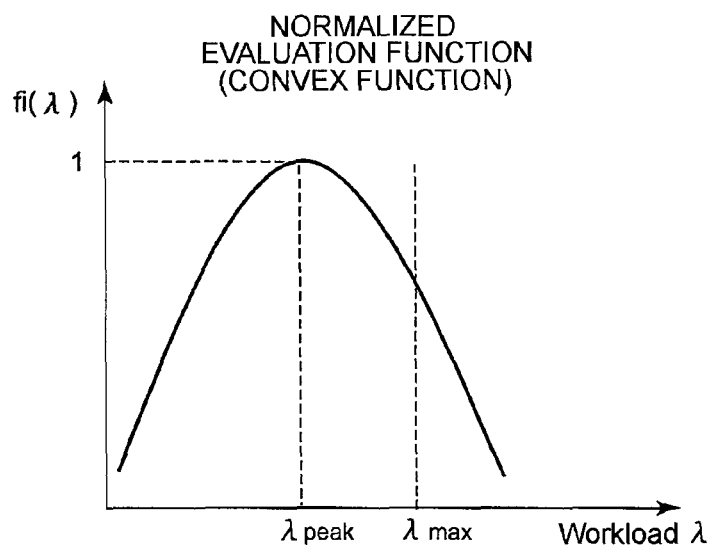
FIG. 13 is an explanatory diagram illustrating an example of an evaluation function used in this invention.

FIG. 13 is a schematic diagram of an evaluation function.

The axis of abscissa represents the workload (Mathematical Expression 34) because the subject studied here is load balancing. As described above, convex functions are preferred as evaluation functions, and a quadratic function that is convexed upward is used here. The symbol $\lambda_{max}$ represents a limit of a server resource, and the symbol $\lambda_{peak}$ represents a peak point of the evaluation function. By normalization in which the peak of the evaluation function is set as 1, the normalized evaluation function in this case is determined as a quadratic function that passes through (0, 0) and ($\lambda_{peak}$, 1).

$$\lambda_i \qquad \text{Mathematical Expression 34}$$

What should be noted here is that, unlike the first embodiment, the evaluation function does not have a negative value around the origin, which means that activating the server 121 does not cost. This is an appropriate way when activation/shutdown does not deteriorate response and throughput much.

An evaluation function is set to each function block by multiplying the normalized evaluation function by a coefficient $\alpha_i$, which is in proportion to a difference in performance between components (resources). As described above, a rather light workload (Mathematical Expression 35) is distributed among the components (resources) when response is valued more, and a rather heavy workload is distributed when throughput is valued more. Accordingly, in the case where the system is to process work by putting importance to response, the point $\lambda_{peak}$ is set rather small whereas the point $\lambda_{peak}$ is set rather large when the system is to process work by putting importance to throughput.

$$\lambda_i \qquad \text{Mathematical Expression 35}$$

The system uses the method of this invention to operate while solving the unit commitment problem, so as to accomplish load balancing that allocates, to each component, a workload as close to the point $\lambda_{peak}$ of the component as possible. Therefore, with the point $\lambda_{peak}$ set rather small, work is distributed among components bearing relatively light loads, and the overall system operates in a manner that values response more.

With the point $\lambda_{peak}$ set rather large, work is distributed among components bearing relatively heavy loads, and the overall system operates in a manner that values throughput more. The system consequently shuts down resources that are being wasted as seen fit, thereby accomplishing control free from a waste of energy as well.

The axis of ordinate of the evaluation function in this case does not really represent some form of efficiency. The axis of ordinate rather indicates a point where the administrator wishes for the system to operate, and setting the evaluation function is not ruled by any physical quantity or principle. A person who wishes to run the system can set the axis of ordinate and the axis of abscissa at his/her own discretion. In a sense, once the system is given an instruction from a person in the form of an evaluation function, the system operates autonomously in a concerted manner from then on.

While the evaluation function here is obtained by multiplying a quadratic function that passes through (0, 0) and ($\lambda_{peak}$, 1) by the coefficient $\alpha_i$, various other evaluation functions can be set as long as the evaluation functions are convex functions. In an extreme case, a hand-drawn evaluation function may be set to each component.

The configuration of FIG. 7 and the configuration of FIG. 8 have both been carried out as the server-load balancer structure inside the data center 120. The configuration of FIG. 7 is of the conventional system example, and FIG. 8 is the configuration of this invention.

In both cases, the control system 100 of FIG. 10 is mounted in the load balancer 70 or each of the load balancers 80. As in the first embodiment, the virtual evaluation function creating unit 101 (see FIG. 10) is not used in the conventional system example.

Coefficients $K_1$ and $K_2$ for determining load balancing and others are set suitably. The total count of servers 121 is 1,000. Performance is not uniform among the servers 121, and a larger $\alpha_1$ is set to the server 121 that has a higher performance.

Figure 14A:
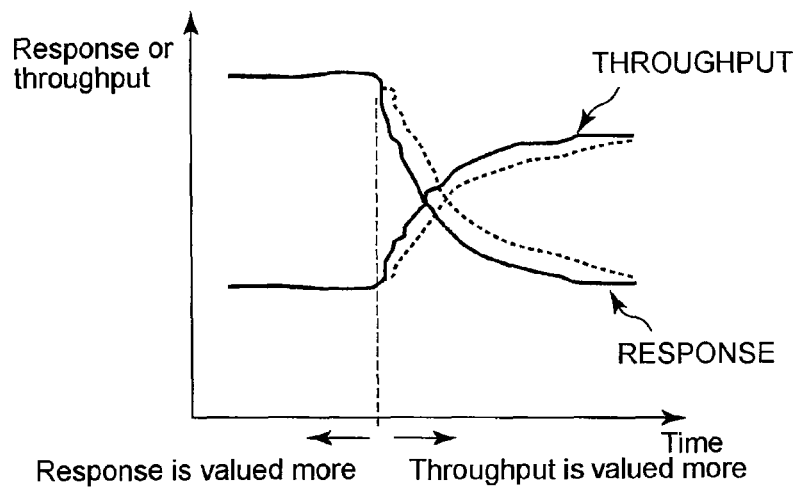
FIG. 14A is an explanatory diagram illustrating an experiment result in the second embodiment of this invention.
Figure 14B:
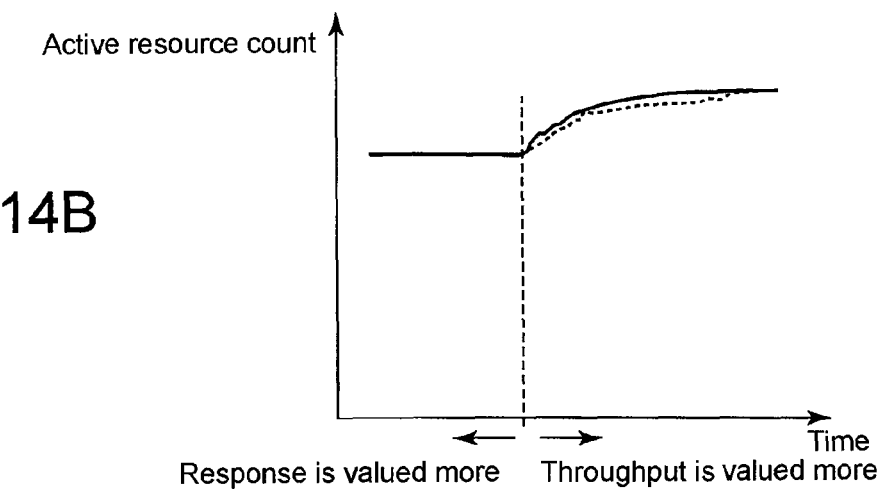
FIG. 14B is an explanatory diagram illustrating an experiment result in the second embodiment of this invention.

FIGS. 14A and 14B show a first experiment result.

The axis of abscissa represents time in each of the graphs. The axis of ordinate represents the overall effective response/throughput of the system in FIG. 14A, and the count of servers that are active (active resource count) in FIG. 14B.

The system is at first run in a manner that puts importance to response by setting $\lambda_{peak}$ rather small. Thereafter, $\lambda_{peak}$ is reset so as to have a rather large value at a time point where "throughput is valued more" is written in FIGS. 14A and 14B. The solid line represents this invention and the broken line represents the conventional system example in which the components are not hierarchized.

The graphs show that, in both cases, the system autonomously shifts its operation toward a direction where response is valued more. The count of active servers is also adjusted appropriately, which indicates the effectiveness of the control. The graphs also show that the operation of this invention is quicker. The quickness is owing to the efficiency in calculation and network which is brought about by hierarchization, and the effectiveness of this invention has been confirmed.

Figure 15A:
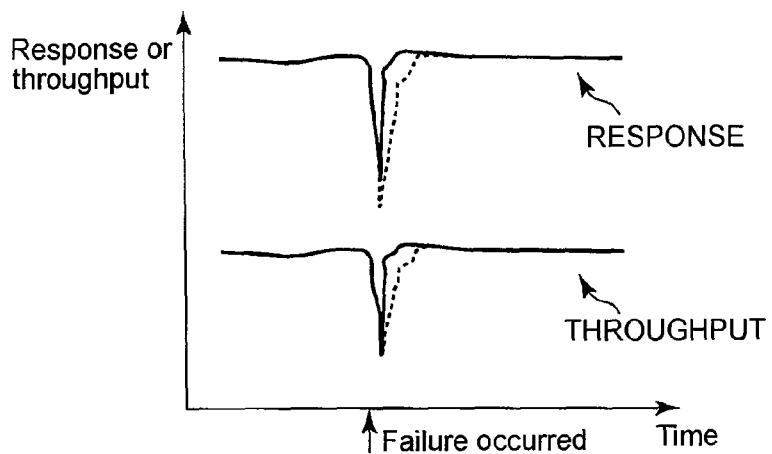
FIG. 15A is an explanatory diagram illustrating an experiment result in the second embodiment of this invention.
Figure 15B:
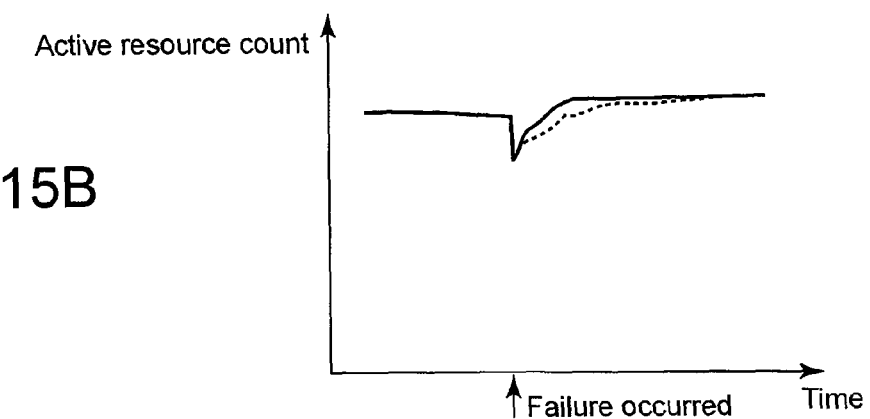
FIG. 15B is an explanatory diagram illustrating an experiment result in the second embodiment of this invention.

FIGS. 15A and 15B show a second experiment result.

The axis of abscissa represents time in each of the graphs. The axis of ordinate represents the overall effective response/throughput of the system in FIG. 15A, and the count of servers that are active (active resource count) in FIG. 15B.

When the system is operating at certain $\lambda_{peak}$ settings, ten percent of servers are artificially stopped (a point indicated by an arrow in each graph). The solid line represents the invention of this application and the broken line represents the conventional case where the components are not hierarchized. The graphs show that, in both cases, performance drops temporarily but recovers autonomously. The graphs also show that this invention is quicker to recover. The quickness is owing to the efficiency in calculation and network which is brought about by hierarchization, and the effectiveness of this invention has been confirmed.

Because the system has heterogeneous servers whose abilities are not uniform, the count of servers that are in use after autonomous recovery differs from before the servers are stopped artificially. This is the very indication that the unit commitment problem has been solved autonomously. The effectiveness of this invention with regard to robustness against failure has thus been confirmed as well.

Third Embodiment

While what can be described as system control is carried out in the first and second embodiments, this invention is basically applicable to any use where a plurality of function blocks are controlled so as to cooperate with one another. For instance, this invention can be used for the control of an actuator for a robot or the like. This invention is carried out for and applied to the control of such an actuator in this embodiment.

Figure 16:
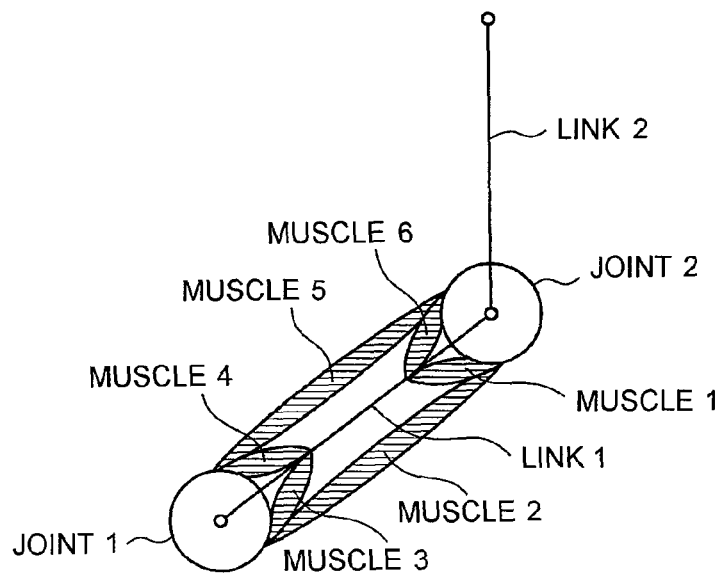
FIG. 16 is a schematic diagram of a system studied in a third embodiment of this invention.

A case of applying this invention to a 6-muscle, 2-joint, and 2-link redundant musculoskeletal system of FIG. 16 is described.

A 6-muscle, 2-joint, 2-link redundant musculoskeletal system is a human hand model that literally has six muscles (Muscle 1 to Muscle 6) and two joints (Joint 1 and Joint 2). The model reproduces the motion of an arm on a two-dimensional plane well.

The torque of joints can be calculated by setting a desired hand motion. The torque of joints and the contraction of each muscle are related to each other, and influence on the torque can be estimated by setting a muscle contraction. In the case of this model, however, muscles have a greater degree of freedom than the degree of freedom of joints, and therefore the value of the contractile force of each muscle for achieving a desired torque of joints cannot be determined uniquely.

In other words, a set of various muscle contractile forces is presented as solutions. This is called an ill-posed problem in which the solution cannot be determined uniquely. In such cases, setting a constraint condition is effective for determining the muscle contractile force uniquely.

The inventors of this invention believe that a set of muscle contractile forces should be determined so as to minimize muscle efficiency, for this has an advantage in terms of energy. Then this problem becomes the "unit commitment problem", namely, a matter of load balancing. The problem can be interpreted as which muscle is to be moved (this corresponds to load) in order to control most efficiently. The system is controlled by the method of this invention so that muscle efficiency when the muscle contractile force is treated as load is optimized as much as possible.

The method of this invention is capable of real-time load balancing and therefore is very effective for the control of control equipment such as a robot. While the example shown here is of an arm, the same control can be executed for a robot leg. How important the real-time characteristic is will easily be understood when the case of a leg is considered: if the calculation for load balancing takes too long, the robot will fall down during the calculation.

Evaluation functions are set to respective muscles in order to apply the control method of this invention to the robot arm. Load in this case is the muscle contractile force, which is represented by the axis of abscissa. Muscle efficiency is set to the axis of ordinate in order to maximize the efficiency of muscles. Muscle efficiency is in general expressed by the following Mathematical Expression 9. When the default energy consumption is given as $H_{def}$, work-hour energy consumption is given as $W(\lambda)$, and work-hour additional energy consumption is given as $H$, the efficiency is expressed as follows (Mathematical Expression 36).

$$f_i(\lambda) = \frac{W(\lambda)}{H_{def} + W(\lambda) + H} \qquad \text{Mathematical Expression 36}$$

This efficiency is in general a convex function that peaks at some point that is equal to or less than $\lambda_{max}$ (the maximum value of muscle contraction in this case).

This model has been used to compare this invention and a conventional system example. As an embodiment of this invention, Muscles 1, 2, and 3 (see FIG. 16) are grouped together and a processing unit (not shown) is set up to serve as a load balancer for balancing load among the muscles.

The control system 100 of this invention which is illustrated in FIG. 10 is accordingly installed in the processing unit. The processing unit, though not shown in FIG. 16, is mounted to Link 1. Each muscle is driven by a driving unit, which is mounted near the muscle, and the processing unit serving as a load balancer issues an instruction to the driving units. In the conventional system example, the control system 100 of FIG. 10 is installed in each of the driving units which drive the respective muscles. The conventional system example does not put the virtual evaluation function creating unit 101 (see FIG. 10) to work as in the first and second embodiments.

Figure 17:
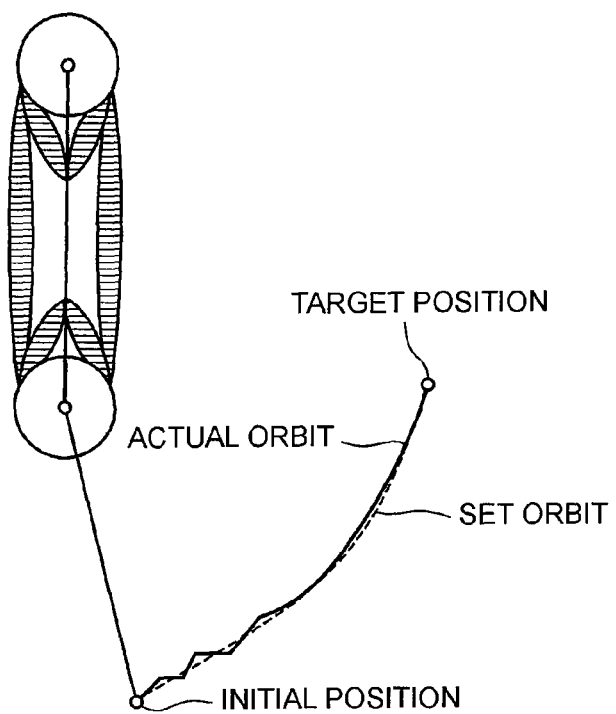
FIG. 17 is an explanatory diagram illustrating an experiment result in the third embodiment of this invention.

A result of controlling the robot arm so as to move the hand to a target position is illustrated in FIG. 17. FIG. 17 is the experiment result of this embodiment, and shows that the hand arrives at the target position by practically tracing a target orbit. In other words, the control has worked well. It has also been confirmed that similar control is possible in the conventional system example.

Figure 18:
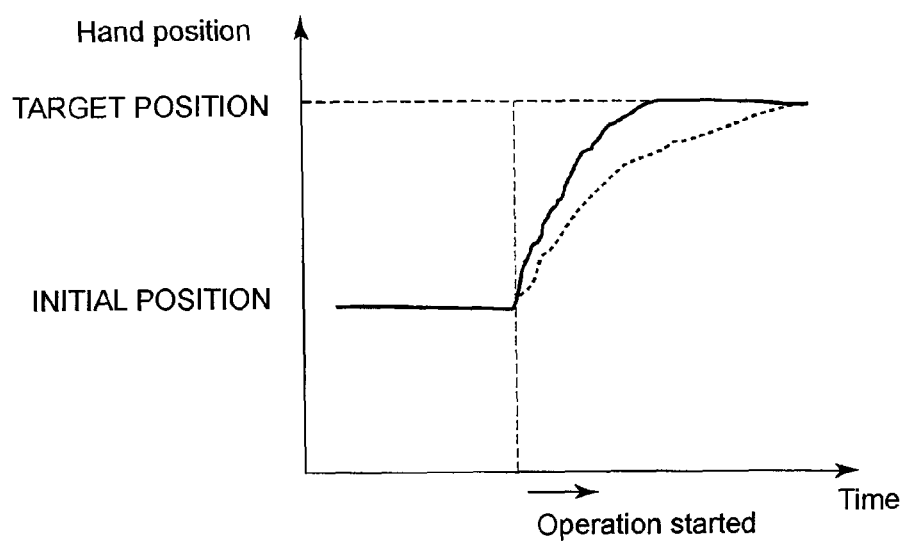
FIG. 18 is an explanatory diagram illustrating an experiment result in the third embodiment of this invention.

FIG. 18 shows how long it takes to arrive at the target position in this invention and in the conventional system example.

The axis of abscissa represents time and the axis of ordinate represents hand position in the graph of FIG. 18. The solid line represents this invention and the broken line represents the conventional system example in which the components are not hierarchized. The graph shows that this invention reaches the target position more quickly, which proves that load is balanced efficiently in this invention.

This invention has thus been confirmed to be a method capable of handling integrally and efficiently a very wide range of control equipment including power generators, data centers, and robots.

Hereinabove, the embodiment mode of this invention has been described in detail based on the embodiments. However, this invention is not limited to the above-mentioned embodiments, and various modifications can be made without departing from the technical idea of this invention.

For instance, while application to a data center in the IT field is presented in the second embodiment, this invention is similarly applicable to the arrangement/load balancing of storage. A delay over a network which is not considered in the second embodiment can be taken into account by multiplying an evaluation function of an adjacent server by a coefficient corresponding to a network delay.

The energy efficiency of a data center may be optimized by setting, as an evaluation function of the data center, an energy efficiency function such as the one in the third embodiment, other than response and throughput.

The evaluation functions, which are set in advance here, may be learned or improved through autonomous feedback.

In the field of controlling a robot or the like, this invention is of course applicable to a robot leg and a robot body aside from the described embodiment which is an application to an arm (the third embodiment). The same is true for non-humanoid robots such as a snake-type robot. This invention can also be applied to load balancing among wheels of a vehicle that has many wheels, though the effect of load balancing is little in four-wheel vehicles. This invention is basically applicable to and presents a significant effect for any case where a control object is controlled by a controller whose degree of freedom is greater than that of the control object.

INDUSTRIAL APPLICABILITY

This invention can be used for general control of a system that includes a plurality of function blocks and runs the plurality of function blocks by integrating the function blocks in a manner adaptive to autonomous decentralization. This invention accomplishes, easily and in a scalable manner, control for making the system robust against external disturbance and for adapting the system in real time in a manner that depends on the situation.

This application is based on Japanese Patent Application No. 2011-187702, filed on Aug. 30, 2011, the entire disclosure of which is incorporated herein by reference.

The invention claimed is:

1. A method of controlling a system having a plurality of correlated function blocks, comprising:
setting an evaluation function about a function block state in association with each of the plurality of function blocks;
setting, as a virtual function block, a group of predetermined function blocks selected from the plurality of function blocks;
creating a virtual evaluation function by using the evaluation function associated with each of the predetermined function blocks contained in the virtual function block; and
controlling the system based on the virtual evaluation function,
wherein, when an operation level of each of the function blocks is expressed by Mathematical Expression (1), where i represents a function block number, the evaluation function of the function block is expressed by Mathematical Expression (2), a differential of the evaluation function at the operation level is expressed by Mathematical Expression (3), an inverse function thereof is expressed by Mathematical Expression (4), and the virtual evaluation function has an axis of abscissa expressed by Mathematical Expression (5) and an axis of ordinate expressed by Mathematical Expression (6), where j represents a number assigned to the virtual function block for which the virtual evaluation function is created, Mathematical Expression (8) and Mathematical Expression (9) are established with respect to a certain value, which is expressed by Mathematical Expression (7), where Mathematical Expression (1) is $\lambda_i$,
Mathematical Expression (2) is $f_i$,
Mathematical Expression (3) is $$h_i = \frac{df_i}{d\lambda_i},$$

Mathematical Expression (4) is $h_i^{-1}$,
Mathematical Expression (5) is $\lambda_{uj}$,
Mathematical Expression (6) is $f_{uj}$,
Mathematical Expression (7) is $\eta$,
Mathematical Expression (8) is $$\lambda_{uj} = \sum_i h_i^{-1}(\eta) \text{ (added only when } h_i^{-1} > 0 \text{ is true)},$$

and
Mathematical Expression (9) is $$f_{u,j} = \sum_i f_i\lfloor h_i^{-1}(\eta)\rfloor \text{ (added only when } h_i^{-1} > 0 \text{ is true)},$$

wherein the evaluation function comprises a convex or concave function,
wherein, in the controlling of the system based on the virtual evaluation function an activation or a shutdown of each of the function blocks is controlled and an operation level in activating of the function block which is controlled to activate is controlled, so as to equalize differential values of the evaluation functions of the function blocks or differential values of the virtual evaluation functions, and
wherein each of the plurality of function blocks is one from among a power generator, a power conditioner and a rechargeable battery, and the operation level is a power generation amount.

2. A method according to claim 1, further comprising:
grouping a plurality of virtual function blocks together to constitute an upper virtual function block; and creating a virtual evaluation function of the upper virtual function block by using the virtual evaluation functions of the virtual function blocks, to thereby create hierarchized virtual function blocks.

3. A method according to claim 1, wherein the system operates by integrating the function blocks in an autonomous decentralized adaptive manner.

4. A method of controlling a system having a plurality of correlated function blocks, comprising:
setting an evaluation function about a function block state in association with each of the plurality of function blocks;
setting, as a virtual function block, a group of a predetermined function blocks selected from the plurality of function blocks;
creating a virtual evaluation function by using the evaluation function associated with each of the predetermined function blocks contained in the virtual function block; and
controlling the system based on the virtual evaluation function,
wherein, when an operation level of each of the function blocks is expressed by Mathematical Expression (1), where i represents a function block number, the evaluation function of the function block is expressed by Mathematical Expression (2), a differential of the evaluation function at the operation level is expressed by Mathematical Expression (3), an inverse function thereof is expressed by Mathematical Expression (4), and the virtual evaluation function has an axis of abscissa expressed by Mathematical Expression (5) and an axis of ordinate expressed by Mathematical Expression (6), where j represents a number assigned to the virtual function block for which the virtual evaluation function is created, Mathematical Expression (8) and Mathematical Expression (9) are established with respect to a certain value, which is expressed by Mathematical Expression (7), where Mathematical Expression (1) is $\lambda_i$,
Mathematical Expression (2) is $f_i$,
Mathematical Expression (3) is $$h_i = \frac{df_i}{d\lambda_i},$$

Mathematical Expression (4) is $h_i^{-1}$,
Mathematical Expression (5) is $\lambda_{uj}$,
Mathematical Expression (6) is $f_{uj}$,
Mathematical Expression (7) is $\eta$,
Mathematical Expression (8) is $$\lambda_{uj} = \sum_i h_i^{-1}(\eta) \text{ (added only when } hi - 1 > 0 \text{ is true),}$$

and
Mathematical Expression (9) is $$f_{u,j} = \sum_i f_i \lfloor h_i^{-1}(\eta) \rfloor \text{ (added only when } hi - 1 > 0 \text{ is true),}$$

wherein the evaluation function comprises a convex or concave function, wherein, in the controlling of the system based on the virtual evaluation function an activation or a shutdown of each of the function blocks is controlled and an operation level in activating of the function block which is controlled to activate is controlled, so as to equalize differential values of the evaluation functions of the function blocks or differential values of the virtual evaluation functions, and wherein each of the plurality of function blocks is a server in a data center, and the operation level is a task amount.

5. A method of controlling a system having a plurality of correlated function blocks, comprising:
setting an evaluation function about a function block state in association with each of the plurality of function blocks;
setting, as a virtual function block, a group of a predetermined function blocks selected from the plurality of function blocks;
creating a virtual evaluation function by using the evaluation function associated with each of the predetermined function blocks contained in the virtual function block; and
controlling the system based on the virtual evaluation function,
wherein, when an operation level of each of the function blocks is expressed by Mathematical Expression (1), where i represents a function block number, the evaluation function of the function block is expressed by Mathematical Expression (2), a differential of the evaluation function at the operation level is expressed by Mathematical Expression (3), an inverse function thereof is expressed by Mathematical Expression (4), and the virtual evaluation function has an axis of abscissa expressed by Mathematical Expression (5) and an axis of ordinate expressed by Mathematical Expression (6), where j represents a number assigned to the virtual function block for which the virtual evaluation function is created, Mathematical Expression (8) and Mathematical Expression (9) are established with respect to a certain value, which is expressed by Mathematical Expression (7), where Mathematical Expression (1) is $\lambda_i$,
Mathematical Expression (2) is $f_i$,
Mathematical Expression (3) is $$h_i = \frac{df_i}{d\lambda_i},$$

Mathematical Expression (4) is $h_i^{-1}$,
Mathematical Expression (5) is $\lambda_{uj}$,
Mathematical Expression (6) is $f_{uj}$,
Mathematical Expression (7) is $\eta$,
Mathematical Expression (8) is $$\lambda_{uj} = \sum_i h_i^{-1}(\eta) \text{ (added only when } hi - 1 > 0 \text{ is true),}$$

and
Mathematical Expression (9) is $$f_{u,j} = \sum_i f_i \lfloor h_i^{-1}(\eta) \rfloor \text{ (added only when } hi - 1 > 0 \text{ is true),}$$

wherein the evaluation function comprises a convex or concave function,
wherein, in the controlling of the system based on the virtual evaluation function an activation or a shutdown of each of the function blocks is controlled and an operation level in activating of the function block which is controlled to activate is controlled, so as to equalize differential values of the evaluation functions of the function blocks or differential values of the virtual evaluation functions, and wherein each of the plurality of function blocks is one from among a motor and a piezo-electric device of a robot, and the operation level is a torque or a force.

* * * * *

UNITED STATES PATENT AND TRADEMARK OFFICE
CERTIFICATE OF CORRECTION

PATENT NO. : 10,261,478 B2
APPLICATION NO. : 14/241974
DATED : April 16, 2019
INVENTOR(S) : Masatsugu Ogawa and Masafumi Yano It is certified that error appears in the above-identified patent and that said Letters Patent is hereby corrected as shown below:

On the Title Page

Assignee (73):
Delete "NEC CORPORATION, Minato-ku, Tokyo (JP)"
Insert -- NEC CORPORATION, Minato-ku, Tokyo (JP); MASAFUMI YANO, Miyagi (JP) --

Signed and Sealed this
Twenty-seventh Day of August, 2019

Andrei Iancu
*Director of the United States Patent and Trademark Office*